Nov. 11, 1952

C. A. S. THORSTENSSON-RYDBERG 2,617,732

PROCESS FOR TREATMENT OF CREAM AND MILK

Filed June 1, 1945

INVENTOR.

Carl A. S. Thorstensson-Rydberg.

By William C. Linton.

Atty.

Nov. 11, 1952

C. A. S. THORSTENSSON-RYDBERG 2,617,732

PROCESS FOR TREATMENT OF CREAM AND MILK

Filed June 1, 1945

INVENTOR.

Carl A. S. Thorstensson-Rydberg.

By William C. Linton.
Att.

Patented Nov. 11, 1952

2,617,732

UNITED STATES PATENT OFFICE 2,617,732

PROCESS FOR TREATMENT OF CREAM AND MILK

Carl Anders Sverker Thorstensson-Rydberg, Stockholm, Sweden, assignor to J. R. Andersson & Co., Aktiebolag, Sundbyberg, Sweden Application June 1, 1945, Serial No. 596,998 In Sweden January 17, 1945

1 Claim. (Cl. 99—119)

The present invention relates to a method of producing butter wherein the whole procedure is effected consecutively under atmospheric pressure in one and the same apparatus.

The apparatus intended for this purpose consists of a cylindrical drum which is closed at one end thereof and is provided at the other end thereof with a cover for the introduction and removal of the ingredients. The drum which forms a body of revolution is provided with a double jacket, so that a jacket space is formed into which heating and cooling agents may be introduced for the heating and cooling of the contents, respectively. The drum is provided on the inside thereof with a single stirring wing extending from the closed end upwardly toward the upper end. The wing may terminate either before the double jacket terminates, or at the same point where the double jacket terminates. The wing may be obliquely positioned relative to the axis of the drum and may be made with double walls so as to form a hollow space which may be adapted to communicate with the jacket space. The jacket space also extends about the closed bottom portion. The whole drum may be slightly conical or, where the double jacket is provided it may be cylindrical and then taper toward the opening. The drum is adapted to be rotated about the axis thereof and may also swing about journals, the axes of which extend at right angles to the axis of rotation of the drum. Thus, the drum may stand with the opening turned upwardly or downwardly and it may be placed in oblique positions at intermediate angles relative to the vertical plane.

The present process is made possible by the use of the apparatus herein described and is distinguished by the feature that when the churning procedure begins, the drum is standing with its axis vertical. In this position there is no stirring effect imparted to the contents during the rotary movement of the drum. Subsequently, the drum is turned so that its axis forms an angle of 5° to 10° with a vertical line. In this position a slight stirring effect commences and an acidifying culture may be uniformly mixed into the cream. When the acidification is to be interrupted, the drum is rotated for a few revolutions while the contents are being cooled in order that the ingredients shall obtain the same temperature throughout. This cooling is preferably effected by the introduction of a cooling agent into the jacket space but may also be effected in some other way. The drum is now inclined to an angle between 45° and 90° to the vertical line. The magnitude of the angle depends on the nature of the cream. At this angle the drum is rotated at a speed so adapted that the butter forms within a desired time. The angle to the vertical line is then further increased so that the axis of rotation of the drum forms a larger angle than 90° to the vertical line. This angle may be up to a maximum of 180°. In this position tapping of the churn-milk is effected.

After the tapping of the churn-milk is completed, the actual working commences at an angle of inclination of 45° to 90°, depending upon the consistency of the contents. In this connection, it is of decisive importance that the procedure takes place with only one stirring wing, so that when the mass has been brought up during rotation into the upper portion by the wing, which now serves as a conveying wing, it does not fall down upon any obstacle, which would occur if more than one wing were provided. The mass falls upon the inner wall of the smooth jacket so that disintegration of the mass is prevented. When the working is completed and the treatment finished, the butter is drawn off. The churn is then cleaned by the introduction of hot water in a quantity of about 2½% of the space of the apparatus, the cover being closed and the drum rotated at a variable angle from 0° to 180° to the vertical line. The churn is now ready for a repetition of the process in churning additional milk and cream.

According to the invention, provision is made for the processing of butter in a drum wherein the process begins with the churning drum at a very small angle between the axis of the container and a vertical line in order to effect a very slight stirring during the first part of the process. The rotatable and tiltable churn permits succesive increases in the angle of the drum for the remaining steps in the churning process in the same apparatus.

The accompanying drawings illustrate means of carrying out the invention:

Figure 1:
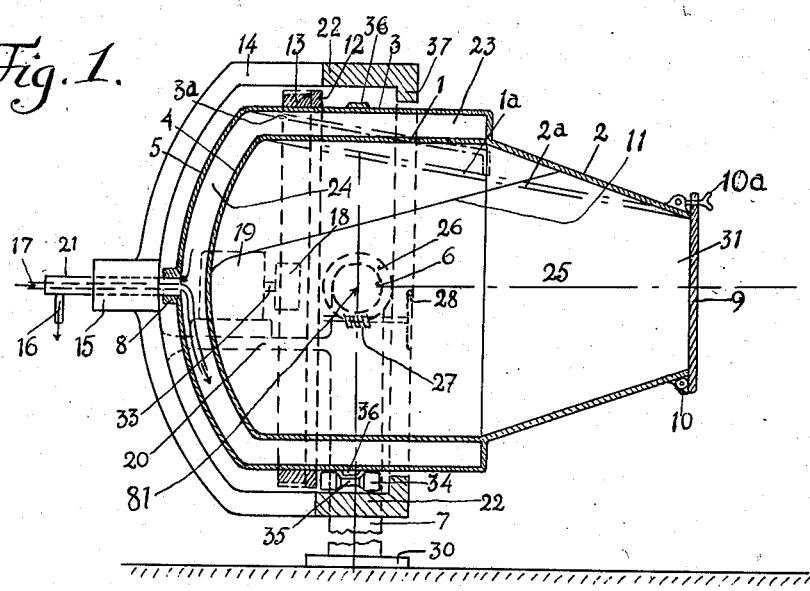
Figure 1 is a view taken in section longitudinally of the container through a vertical plane of symmetry.
Figure 2:
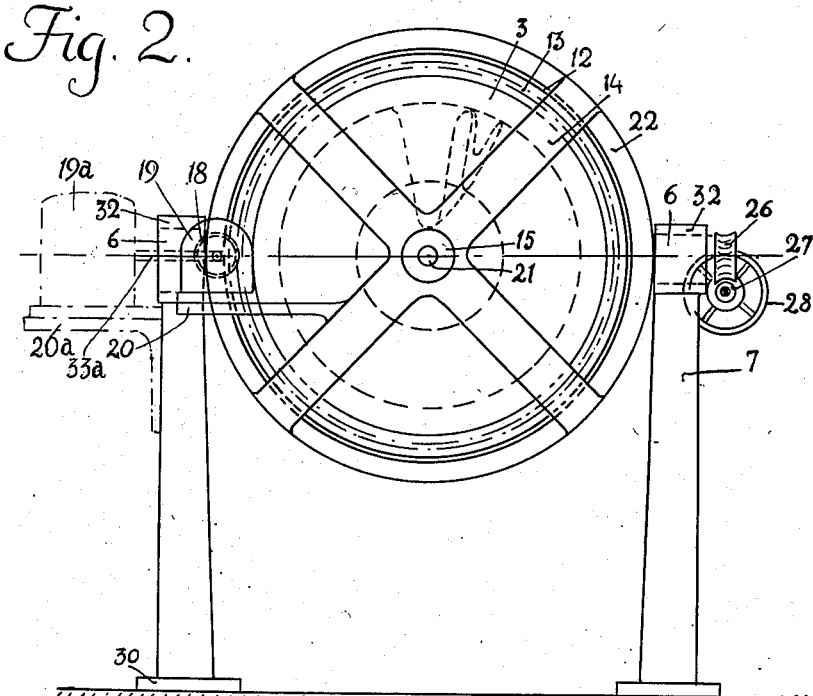
Figure 2 is an end view of the container.
Figure 3:
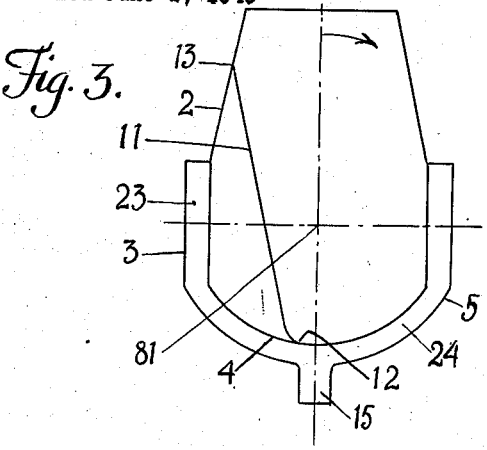
Figures 3 and 5 show the container in section through the axis of rotation in two different positions.

In the drawings, Figures 1 to 4 inclusive show a butter churn comprising a cylindrical body portion 1 having a dished rear end. Projecting from the front of the body 1 is a conical portion or mantle 2 which ends in a charge- and discharge-opening 31, which is closed by a cover 9 mounted on hinges 10 and adapted to be fastened in a closed position by a bolt arrangement 10a. Surrounding the body portion 1 is a mantle or jacket wall 3 and around the end are a gable mantle wall 4 and a similar gable mantle or jacket wall 5 arranged at a distance from the former mantle walls in order to form a heating and cooling mantle space 23, 24. The outer gable mantle wall 5 is provided with a central nipple 8 through which steam and condensate conduits are led to the mantle space 24. These conduits are arranged in a conductor 21 mounted in the center part 15 of a support in the form of a cross 14 which is directly attached to a bearing-ring 22 which in turn is attached to journals 6. The journals are horizontally arranged in bearings 32 which are supported by standards 7 having foot plates 30. The box 21, to which charge conduit 17 and discharge conduit 16 are connected, can be combined with an axial bearing which may be provided with arrangements to take up the axial pressure. Close to a ring 12, fixed to mantle wall 3, a cog ring 13 is arranged to cooperate with a cog wheel 18 placed on a motor shaft 33 of an electric motor 19. This motor is placed on a special bracket 20 which is supported by the bearing-ring 22 and the system of cross arms 14. To one journal 6 is connected a helical wheel 26 which is in contact with a helix 27 which in turn is acted upon by a handwheel 28. By this mechanism the butter churn can be turned in such a way that the opening 31 may be directed upwardly or downwardly for charging the ingredients or for discharging the contents of the container respectively.

The inner side of the bearing-ring 22 is arranged as a bearing surface for rolls 34 which are double formed and provided with a central part 35 which is of smaller diameter than the rolls. This provides a space for a guide bar 36 between the rolls 34. The bar is arranged on mantle wall 3. A flange 37 on ring 12 prevents the rolls from shifting laterally.

In the drawings, Figures 3 to 7 show sectional views taken through the container body and also modifications in the construction of the dasher blade or wing.

Through the nipple 8 conduits 17 and 21 are provided for the inlet and outlet of steam, hot or cold air, or water, or other media which circulates in the mantle space 23, 24. The container and the surrounding jacket are fixed together for rotation. The container can rotate around its axis and can, with the jacket, be turned about the axis at bearing points 81 in order to tip and empty the contents. The container can rotate upon its axis of rotation in a horizontal or vertical position or at an angle to the horizontal while inclined upwardly or downwardly.

Figure 5:
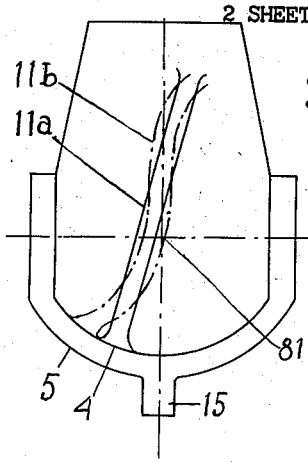
Figure 4:
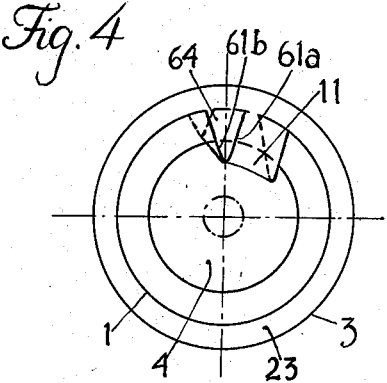
Figures 4 and 6 show transverse sections of the container in a plane through the axis of rotation.
Figure 6:
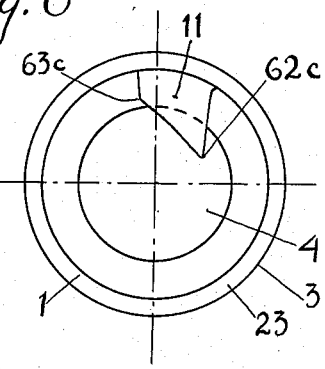

The wing or hollow stirrer 11 is arranged in the container and extends from the closed end 4 at a point 12 near the end of the closed end 4 to a point 13 which is a good distance into the conical portion 2. The wing decreases in breadth in such a way that it ends in a narrow tip at point 13. As shown in Fig. 4 the stirrer 11 is formed by two triangular parts 61a and 61b, which are fastened to the container portions 1, 2 and 4 and project inwardly therefrom radially of the container in spaced relation to each other. However, the stirrer can be formed in any other way. In the stirrer 11 a mantle space 64 is formed which communicates with mantle space 23. In Fig. 5 a stirrer 11a is shown which is inclined in relation to the direction of the axis of rotation. In this figure, a modified stirrer 11b is shown in dotted lines and is formed of oppositely curved or waving design. This stirrer type can be without the hollow space, is desired. In Fig. 6 a stirrer 11 is shown (with starting and end points 63c and 62c) which consists of one plate and which is used if heating or cooling medium is not desired to circulate in the wing or stirrer. If desired, the wing can be limited to the same length of the mantle space.

Figure 7:
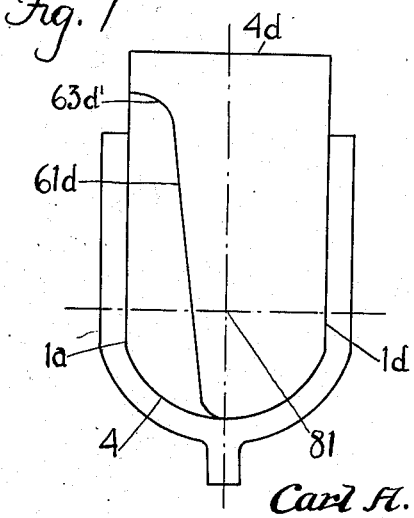
Figure 7 shows a cross-section of the container with an entirely cylindrical drum.
Figure 8:
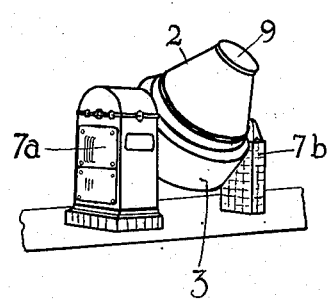
Figure 8 shows a perspective view of the apparatus with the drum arranged in an inclined position.

In Fig. 7 a container 1a is shown which is made without the conical part so that the body 1d is cylindrically continuous and of the same diameter between the end wall 4 and the discharge opening 4d. The wing 61d does not end in a point but extends therefrom into the center of the container to a point $63d^1$. Fig. 8 shows the churn on supporting columns 7a and 7b, one of which supports may form a conductor for the heating or cooling medium to be supplied to the mantle space.

The wing can have more than one hollow space and can, for example, have a special compartment for electrical heating elements. Also the hollow space in the wing 11 may be divided into a different number of spaces either across the wing or lengthwise of the wing. The different spaces can communicate with different central charge openings for heating and cooling the medium.

The invention makes it possible to heat the ingredients for ripening as well as for the interruption of the ripening by cooling and for working the butter in the same container. The cooling prevents the butter particles, etc., from adhering to the wall of the container or to the wing. Cooling and heating can be carried out during the working itself which is very important in order to get a good churning.

Another advantage of the process according to the invention is that by using only one wing for working the mass, it can act on the whole mass as the unit and can effect a turning of the mass as it is being worked. This is important in the working of the mass. The curved wing further increases the good result of the working.

By the fact that the churn is adjustable to different angles even when in action, it is possible on the way upward to gather for a working action all particles which have collected at the ends of the churn and which otherwise would not be properly worked.

Another important advantage of the process is that the mass is uniformly worked even though a large quantity of material is worked at the same time. Since the procedure can be carried out at atmospheric pressure, the arrangement is cheaper in price than other apparatus operating under vacuum.

The apparatus described above as well as the described process can be applied to other purposes than the production of butter and margarine as for example, in the production of cheese or to the disinfection or sterilization of certain objects or to cooking operations of all kinds.

What I claim is:

An improved process for producing butter under atmospheric pressure from cream and milk in a rotating tiltable container provided with a single wing on the inside of the container to stir the cream and milk and lift the butter, which comprises introducing a mixture of cream and milk into the container, slightly stirring the mixture with an acidifying culture with the container at an axis inclined 5° to 10° from the vertical line to obtain a uniform mixture, indirectly cooling the mixture to interrupt the acidification, increasing the stirring of the mixture in the container with the container inclined at 45° to 90° from the vertical line to effect a churning of the mixture, tapping the churn milk with the container at an angle between 90° and 180° from the vertical line, separately recovering the butter in said container, working the butter in said container with the container inclined at 45° to 90° from the vertical line by repeatedly lifting the butter and permitting it to fall from the lifted position onto an inner wall of said rotating container.

CARL ANDERS SVERKER
THORSTENSSON-RYDBERG.

REFERENCES CITED

The following references are of record in the file of this patent:

UNITED STATES PATENTS

| Number | Name | Date |
|---|---|---|
| 859,823 | Lillard | July 9, 1907 |
| 886,018 | Sellentine | Apr. 28, 1908 |
| 1,014,574 | De Lisle | Jan. 9, 1912 |
| 1,212,483 | Heller | Jan. 16, 1917 |
| 1,322,289 | Chapman | Nov. 18, 1919 |
| 2,241,930 | Pike | May 13, 1941 |

FOREIGN PATENTS

| Number | Country | Date |
|---|---|---|
| 355,850 | Great Britain | Sept. 3, 1931 |